Dec. 9, 1941.          E. GILBERT                 2,265,900
                    JOURNALING OF SHAFTS
                    Filed March 29, 1940
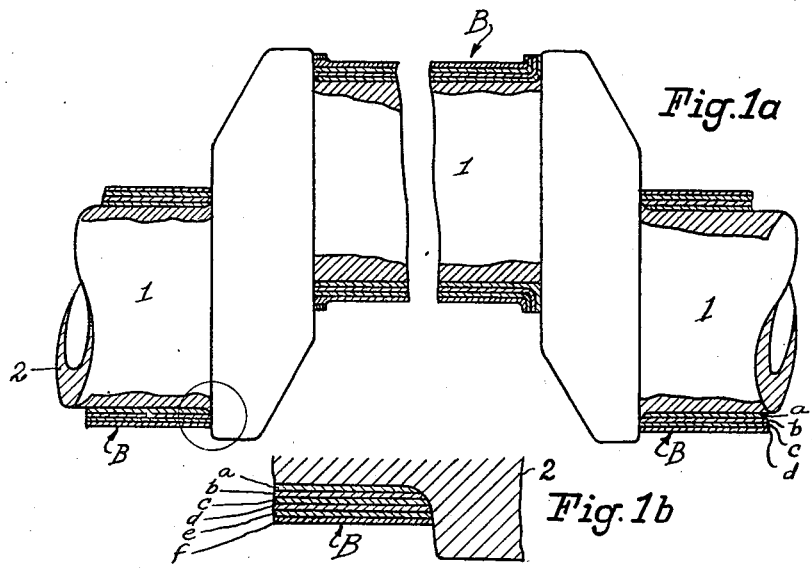
Inventor:
Ernst Gilbert
by his attorneys
Howson and Howson Patented Dec. 9, 1941

2,265,900

UNITED STATES PATENT OFFICE 2,265,900

JOURNALING OF SHAFTS

Ernst Gilbert, Berlin-Oberschoneweide, Germany

Application March 29, 1940, Serial No. 326,791
In Germany April 5, 1939

1 Claim. (Cl. 154—2)

It is known in journaling shafts to make use of brasses or liners for the bearing made of compressed synthetic resin. It has also been already suggested to secure such liner of compressed synthetic resin to the shaft proper for rotation with the latter by means of some kind of adhesive. The winding of such compressed materials upon the shaft was effected by means of a bandage of compressed synthetic resin consisting of a finely meshed fabric which was wound loosely or in the form of a multi-ply band around a mandrel, where the filling material was impregnated either prior to or during the subsequent compressing operation with a liquid synthetic resin, while the synthetic material was rendered solid during the compressing operation by pressure, heat and the addition of some solidifiers.

The intensity of the impregnation within the filler depends here on the preliminary impregnation of the said filler or on the replenishing possible according to the kind of the press used and on the losses in synthetic resin occurring during the pressing operation. If prepared carefully it will be uniformly distributed over the whole layer of the liner. Although this step might appear adequate and suitable in many instances, the uniformity of the impregnation in the whole bandage is not desirable in that case in which the said bandage is to be secured rigidly to the surface of the shaft by means of some adhesive means. A gluing by means of synethetic resin or similar products of polymerisation which is free from objection will require an extraordinary lean impregnation at the gluing surface.

In contradistinction to this a substantially heavier deposit of synthetic resin is desirable at the outer sliding surface, since the smoothness of the surface and the formation of a mirror-like bright polish of the surface will be improved with an increasing content of synthetic resin.

According to the present invention such a bandage of compressed synthetic resin is to be provided, possessing a heavier impregnation at its outside, and this is achieved for instance in that to the journal is applied a primary bandage, which is only slightly impregnated with synthetic resin, then subjected to a preliminary solidification and glued to the said journal. Subsequently a further bandage possessing a heavier impregnation is likewise hardened and compressed and placed on the top of the said primary bandage, and then a third and more bandages are prepared and placed upon the preceding ones, each having increasing contents of synthetic resin. The difference in the rate of impregnation may also be caused by constantly turning the press-mold together with the shaft during the compressing and hardening operation as long as the synthetic resin is in a liquid or pasty condition, where the speed of rotation must correspond to the liquid state of the synthetic resin each time, that is to say, it must be increased upon a growing solidfication. The press-mold surrounding the bearing concentrically will remain under full compression the pressure being mainly absorbed by the filling material. As the filling material corresponds to a finely meshed, tightly compressed sieve, there will remain through adhesion, in spite of the action of the centrifugal force tending to force the liquid synthetic resin outwardly, always sufficient synthetic resin within the innermost layer to insure the presence of a sufficient quantity of adhesive material at the gluing surface.

The subject matter of the invention is shown by way of example in the drawing, in which Figure 1a is a section through a crank shaft provided with a bandage according to the invention, Figure 1b is a detail drawn to a larger scale and showing the increase in the content of synthetic resin outwardly towards the surface of the bearing material.

Figure 1a illustrates the application of the bearing material according to this invention to the journals I of a crank shaft 2. The bearing material comprises a wrapping B composed of a plurality of layers $a$, $b$, $c$, $d$, $e$, and $f$, of suitable porous material, such as a woven fabric, impregnated with a synthetic resin, the degree of impregnation increasing with each layer outwardly from the journal. Each layer is given a preliminary hardening under pressure and heat in a pressure mold before the succeeding layer is applied, the press mold together with the shaft being turned during the pressing operation, so that owing to the action of centrifugal force, the liquid synthetic resin is forced outwardly and the content of synthetic resin in the wrapping will be greatest at the surface thereof. The speed of rotation of the press mold is adapted to the state of viscosity of the synthetic resin each time.

I claim:

Method for the manufacture of bearings made of compressed synthetic resin comprising in combination: applying to a journal a primary bandage possessing a slight impregnation of synthetic resin; subjecting said bandage to a preliminary hardening process in a press mold under pressure and heat; gluing said bandage to the said journal; placing upon said primary bandage an additional bandage with a more intense impregnation and being also hardened and compressed in said press mold; placing a third and more additional bandages with an increasing content of synthetic resin, prepared in the same manner, upon the preceding bandage and rotating the bandage of filling material impregnated with the synthetic resin together with the shaft and the press mold and adapting the speed of rotation to the state of viscosity of the synthetic resin each time and thus causing a steady increase in the impregnation of the bandage from the inside towards the outside of the said bearing material.

ERNST GILBERT.